(12) United States Patent
Yoon (10) Patent No.: US 11,006,307 B2
(45) Date of Patent: May 11, 2021

(54) MOBILE NETWORK SIGNAL STRENGTH IDENTIFICATION AND VISUALIZATION SYSTEM

(71) Applicant: T-Mobile USA, Inc., Bellevue, WA (US)

(72) Inventor: Jong Sung Yoon, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/447,137

(22) Filed: Jun. 20, 2019

(65) Prior Publication Data

US 2020/0404523 A1    Dec. 24, 2020

(51) Int. Cl.
*H04W 24/10* (2009.01)
*H04W 24/08* (2009.01)
*H04B 17/318* (2015.01)
*H04W 84/04* (2009.01)

(52) U.S. Cl.
CPC .......... *H04W 24/10* (2013.01); *H04B 17/318* (2015.01); *H04W 24/08* (2013.01); *H04W 84/042* (2013.01)

(58) Field of Classification Search
CPC .............................. H04W 24/10; H04W 84/042
See application file for complete search history.

(56) References Cited

U.S. PATENT DOCUMENTS

| | | | | |
|---|---|---|---|---|
| 7,031,714 | B1 * | 4/2006 | Rayburn | H04M 3/367 455/445 |
| 8,417,239 | B1 * | 4/2013 | DeCusatis | H04W 24/08 455/423 |
| 2010/0022263 | A1 * | 1/2010 | Stamoulis | H04W 24/02 455/501 |
| 2013/0325326 | A1 * | 12/2013 | Blumenberg | G01C 21/36 701/428 |
| 2014/0173439 | A1 * | 6/2014 | Gutierrez | G08B 21/0236 715/727 |
| 2016/0353425 | A1 * | 12/2016 | Iwami | H04W 72/0406 |

* cited by examiner

*Primary Examiner* — Kevin C. Harper
*Assistant Examiner* — Derrick V Rose
(74) *Attorney, Agent, or Firm* — Lee & Hayes, P.C.

(57) ABSTRACT

A processor-implemented method includes receiving, from a mobile device, signal strength information indicative of a signal strength of a signal between the mobile device and a network transceiver in a mobile device telecommunications network. The processor determines, based at least in part on the signal strength information, a coverage area associated with the network transceiver, determines, based at least in part on the signal strength information, an aggregated signal strength associated with a location within the coverage area, and determines a predicted signal strength associated with the location. The predicted signal strength is based at least in part on a signal strength estimation model. The processor determines a difference between the aggregated signal strength and the predicted signal strength, determines whether the difference meets or exceeds a signal strength threshold, and generates a message to update hardware component associated with the location.

20 Claims, 5 Drawing Sheets

┌─────────────────────────────────────────────────────────────────────┐
        │  RECEIVE SIGNAL STRENGTH INFORMATION INDICATIVE OF A SIGNAL         │
        │  STRENGTH OF A SIGNAL BETWEEN THE MOBILE DEVICE AND A               │
        │                     NETWORK TRANSCEIVER                             │
        │                              502                                    │
        └─────────────────────────────────────────────────────────────────────┘
                                        │
                                        ▼
        ┌─────────────────────────────────────────────────────────────────────┐
        │  DETERMINE, BASED AT LEAST IN PART ON THE SIGNAL STRENGTH           │
        │  INFORMATION, A COVERAGE AREA ASSOCIATED WITH THE NETWORK           │
        │                          TRANSCEIVER                                │
        │                              504                                    │
        └─────────────────────────────────────────────────────────────────────┘
                                        │
                                        ▼
        ┌─────────────────────────────────────────────────────────────────────┐
        │  DETERMINE, BASED AT LEAST IN PART ON THE SIGNAL STRENGTH           │
        │  INFORMATION, AN AGGREGATED SIGNAL STRENGTH ASSOCIATED WITH         │
        │              A LOCATION WITHIN THE COVERAGE AREA                    │
        │                              506                                    │
        └─────────────────────────────────────────────────────────────────────┘
                                        │
                                        ▼
        ┌─────────────────────────────────────────────────────────────────────┐
        │  DETERMINE A PREDICTED SIGNAL STRENGTH ASSOCIATED WITH THE          │
        │  LOCATION, WHERE THE PREDICTED SIGNAL STRENGTH IS BASED AT          │
        │  LEAST IN PART ON A SIGNAL STRENGTH ESTIMATION MODEL                │
        │                              508                                    │
        └─────────────────────────────────────────────────────────────────────┘
                                        │
                                        ▼
        ┌─────────────────────────────────────────────────────────────────────┐
        │  DETERMINE A DIFFERENCE BETWEEN THE AGGREGATED SIGNAL               │
        │     STRENGTH AND THE PREDICTED SIGNAL STRENGTH                      │
        │                              510                                    │
        └─────────────────────────────────────────────────────────────────────┘
                                        │
                                        ▼
        ┌─────────────────────────────────────────────────────────────────────┐
        │  DETERMINE THAT A CALL DENSITY ASSOCIATED WITH THE LOCATION         │
        │     MEETS OR EXCEEDS A CALL DENSITY THRESHOLD                       │
        │                              512                                    │
        └─────────────────────────────────────────────────────────────────────┘
                                        │
                                        ▼
        ┌─────────────────────────────────────────────────────────────────────┐
        │  GENERATE A MESSAGE TO UPDATE A HARDWARE COMPONENT                  │
        │              ASSOCIATED WITH THE LOCATION                           │
        │                              514                                    │
        └─────────────────────────────────────────────────────────────────────┘
```

*FIG. 5*

MOBILE NETWORK SIGNAL STRENGTH IDENTIFICATION AND VISUALIZATION SYSTEM

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

Network coverage for modern telecommunications systems is often allocated, in part, using prediction analysis of infrastructure that considers a variety of factors, such as known cell tower location, power associated with the cell tower, and other factors. In addition, some coverage analysis may include considering signal levels received by user devices. However, these received signal levels only include data when the user device is connected to the telecommunications network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems, devices, and methods are directed to user equipment including a spectrum analyzer to determine network metrics, and a network device for analyzing such network metrics. Current network coverage analysis may be based, in part, on prediction analysis that considers a variety of factors, such as known cell tower location, power associated with the cell tower, and other factors. In addition, some coverage analysis may include considering signal levels received by a user equipment (UE), such as mobile phones and the like. However, these received signal levels only include data when the user device is connected to the telecommunications network. Thus, there may be geographic areas where network device predicts good coverage, but in fact there is poor coverage, which may be undetectable because the UE is not connected to the network in those areas. For example, some large buildings, and especially those constructed of steel, can functionally result in a "faraday cage" effect that prevents user devices from connected to the telecommunications network when the UE is operated inside of the building. However, a prediction model may predict that the particular building at that location should, in fact, have good coverage, because the cell tower location(s), power associated with the cell tower(s), etc., result in good coverage in the region around the building. Accordingly, it is advantageous to identify geographic areas that are predicted to have good coverage, but in fact do not.

Aspects of the present disclosure may include collecting signal strength information with user devices configured with an application that can collect particular types of signal-related information, even when not connected to the telecommunications network. The information may be indicative of a signal strength of a signal between the mobile device and a network transceiver in the mobile device telecommunications network. In some instances, the signal strength information may include least one of a telecommunications network type associated with the mobile device or a roaming network indicator indicative of a roaming setting on the mobile device. Example information that may be collected with the mobile device (referred to herein as user equipment) can include: (1) a type of network that the user device is connected to (e.g., 5G, LTE, 3G, 2G, no network, etc.); (2) a received signal strength (e.g., reference signal received power (RSRP), etc.); (3) user equipment location (e.g., via a user device-based global positioning system and/or Wi-Fi positioning system); and/or (4) one or more roaming indicators such as, for example, one or more mobile country codes (MCC) and/or mobile network codes (MNC) of the roaming network. In some instances, MCC and/or MNC may be used to detect a type of network accessed by the user equipment. For example, the system may use MCC and/or MNC to evaluate whether the user equipment connects through a captive network, or by enabling roaming network protocols.

In some instances, the user equipment may be configured to collect the signal strength information in response to a variety of triggers. Example triggers can include sending or receiving a voice call, an application-based trigger (e.g., launching a video-streaming application), an indication of signal loss as determined by the user equipment and/or by network devices, battery level thresholds, etc. The user devices may also collect the signal strength information on a periodic basis (e.g., hourly), and save the information to a local device memory.

In some instances, an algorithm functioning as part of a spectrum analyzer or other network tool on the network server may collect the coverage data as crowdsourced from multiple user equipment. The server-based algorithm may compare the crowdsourced data with the predicted coverage data generated by a strength estimation model. If the estimation model indicates that a particular area should have good coverage, but the coverage data shows relatively weak coverage in that area, the network server may determine whether the bad coverage in the particular area affects a threshold number of subscribers and/or if the particular area is of a threshold size.

If the one or more thresholds are met, then the algorithm can automatically generate a message to update hardware component(s) associated with that location. For example, the system may recommend remedial action, such as the installation of a network cell in the particular area with the bad coverage. The system may also generate a graphic output of a map showing relative signal strength of varying colors and opacity that indicate call density and signal strengths. In some aspects, the map may be part of the recommendation, and/or be used to generate the recommendation. The graphic can also be used as a visualization tool to select high-value changes to the network infrastructure.

In some instances, the spectrum analyzer can be implemented as an application or component running on the user equipment configured to interact with an operating system component of the user equipment. The spectrum analyzer may determine, based at least in part on the signal strength information, a coverage area associated with the network transceiver. The spectrum analyzer can instruct the operating system component to control software and/or hardware associated with a transceiver of the user equipment to scan various channels in a frequency resource to determine metrics associated with the frequency resource. In some instances, the frequency resource can be outside of a frequency band or range used by the user equipment to conduct communications. In some instances, the one or more metrics can include, but are not limited to, a received signal strength indication (RSSI), a reference signal received power (RSRP), a reference signal received quality (RSRQ), a signal-to-interference-plus-noise ratio (SINR), and/or a power density for a specific bandwidth in a frequency domain. The one or more metrics can be sent to the network device for aggregation and determination of one or more sources of diminished signal strength. Example sources may include an interference level (e.g., an existing interference level, an estimated interference level, etc.), for example, to determine whether to deploy a transmitter to a location, to deploy a network engineer to tune one or more transmitters to reduce the interference, and the like.

In one use case, the techniques discussed herein can be implemented on a user equipment configured to facilitate user communications using first frequency resources. In some instances, the first frequency resources can include, but are not limited to, an LTE Band 12 (e.g., a 700 MHz Band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a UMTS Band 4, UMTS Band 2, GSM Band 2, 5G (e.g., 3.5 GHz-6 GHz, 28 GHz, etc.) and the like. Further, a spectrum analyzer can be implemented as an application on the user equipment to intermittently scan second frequency resources. In some instances, the second frequency resources can be separate from the first frequency resources. For example, the second frequency resources can include, but are not limited to, an LTE Band 71 (e.g., a 600 MHz band), an LTE Band 48 (e.g., 3400 MHz), and the like. As can be understood, the first frequency resource and the second frequency resource can include any range of wireless frequencies capable of being used to communicate data. Thus, in general, the techniques can include the user equipment using the first frequency resources for communication(s) (e.g., voice communication, data communications, etc.), and can use the spectrum analyzer to scan the second frequency resources, without using the second frequency resources for communication(s). However, in some instances, the techniques can include utilizing the second frequency resources for communication(s), while monitoring metrics associated with the resources to determine sources of interference, for example.

Further, in some instances, the techniques described herein can include determining one or more of a power resource or a location of the user equipment, and initiating scanning of a frequency resource based at least in part on the power resource or the location. For example, if a battery of the user equipment is below a threshold value, the spectrum analyzer can be prevented from scanning a frequency resource. In another example, if a location of the user equipment is outside of an area, such as a geofenced location, the user equipment can be prevented from scanning the frequency resource.

In some instances, the spectrum analyzer can initiate scanning of a frequency resource at a time in which the user equipment is not utilizing the frequency resource for a communication. In some instances, the spectrum analyzer can initiate scanning of the frequency resource at a time in which the user equipment is utilizing the frequency resource for a communication.

The systems, devices, and techniques described herein can improve a functioning of a network by capturing metrics associated with frequency resources that can be used to deploy and/or optimize network hardware. For example, the systems, devices, and techniques can determine when a network resource is occupied by a legacy transmission element (e.g., a television station) to determine that the legacy transmission element can be disabled to allow for the network resource to be utilized for communications by and between user equipment. Further, determining metrics can allow network engineers to tune components (e.g., power level(s), antenna orientation(s), frequency overlap(s), and the like) in a system to reduce interference caused by the various components. Additionally, the systems, devices, and techniques discussed herein provide a distributed framework for spectrum analysis, which can provide network information more efficiently than drive testing, for example. In some instance, the techniques can be used to reduce power consumption to extend a battery life of a user equipment during testing. Further, location-based initiating of scanning can reduce congestion and/or processing of data where such data is not needed. The systems, devices, and techniques discussed herein may also be used to determine network characteristics in locations where there is no signal, such as, for example, within buildings or structures that do not permit some signals to transmit from or to an interior space of the building. These and other improvements to the functioning of a computer and network are discussed herein.

The systems, devices, and techniques described herein can be implemented in a number of ways. Example implementations are provided below with reference to the following figures.

Figure 1:
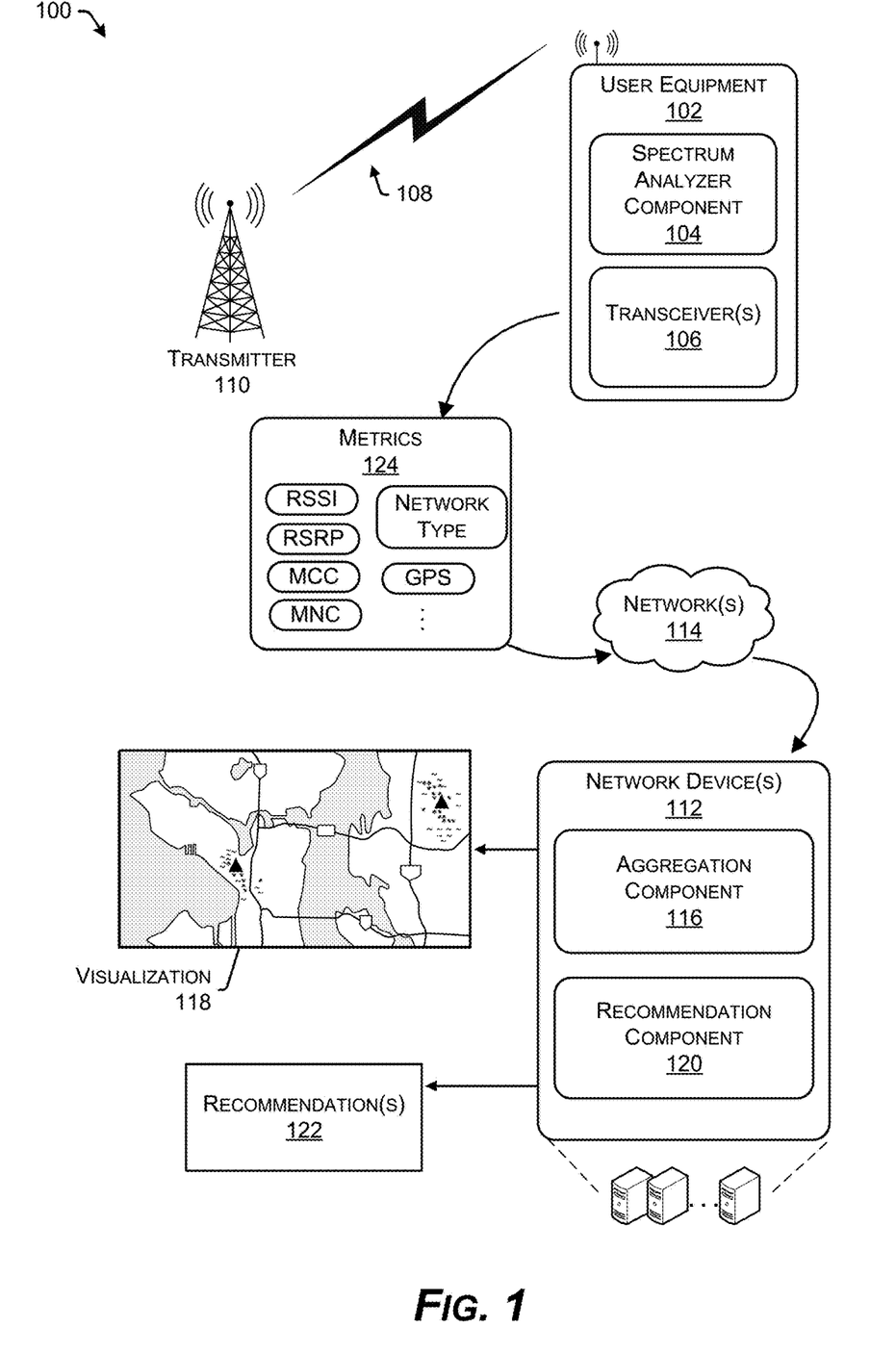
FIG. 1 illustrates an example environment including a user equipment including a spectrum analyzer to facilitate mobile collection of network metrics, as described herein.

FIG. 1 illustrates an example environment 100 including a user equipment (UE) including a spectrum analyzer to facilitate mobile collection of network metrics, as described herein.

In some instances, a user equipment 102 can include a spectrum analyzer component 104 and one or more transceiver(s) 106. In general, the user equipment 102 can receive a signal 108 output by a transmitter 110 to determine one or more metrics associated with the signal 108. In some instances, the user equipment 102 can receive the signal 108 and analyze the signal 108, as discussed herein, independent of conducting any communications via the signal 108 and/or the transmitter 110. In some instances, the transmitter 110 can represent any one-directional or two-directional wireless communication transceiver.

In some instances, the one or more transceiver(s) 106 can receive the signal 108 at the user equipment 102, and the spectrum analyzer component 104 can determine various metrics associated with the signal 108. For example, the one or more metrics can include, but are not limited to, one or more of a received signal strength indication (RSSI), a reference signal received power (RSRP), a reference signal received quality (RSRQ), and a signal-to-interference-plus-noise ratio (SINR). For example, the metrics may include one or more values indicative of RSRP. Further, the metrics can include a channel identifier (e.g., channel 1, 2, . . . , N (where N is an integer)) and/or an indication of a frequency associated with a channel (e.g., 617-622 MHz, 622-627 MHz, 627-632 MHz, . . . , 647-652 MHz). In some instances, the metrics can include a number of channels associated with a particular frequency band. In some instances, the metrics can be determined independently for a channel or for a block of frequencies.

In some instances, based at least in part on metrics, the user equipment 102 and/or a network device can determine characteristics of the signal 108, such as whether the signal is a television signal or a signal for wireless communication (e.g., to exchange (bidirectional) voice and/or data). In some instances, the metrics can include one or more roaming network indicators including one or more MCCs, one or more MNCs, etc. RSRP, often measured in decibel-milliwatts (dBm), is the average power of Resource Elements (RE) that carry cell specific Reference Signals (RS) over the entire bandwidth, so RSRP is only measured in the symbols carrying RS. The average power received from a single RS is often quantified in terms of signal ranges. In some instances, the user equipment 102 can receive a plurality of signals, for example, by tuning one or more filters associated with the transceiver(s) 106, to isolate a specific frequency of a signal. In some instances, the user equipment 102 may measure a plurality of MCC and/or MNC values, and evaluate whether the home network signal is relatively weak based on the measured values. In one aspect, the system may determine that a signal is weak based on multiple measurements of other signals sharing similar characteristics as the subject signal, without measuring the subject signal. For example, the system may identify a plurality of weak signals that share one or more similar characteristics (e.g., geographic region, connectivity with a particular tower or cell, etc.) as the subject signal when the subject signal is not measurable. The subject signal may be unavailable for measurement for various reasons, such as, for example, the signal is so weak that it may not be measurable, or the user equipment may not be able to connect with the network for another reason. In some instances, the system may measure MCC/MNC in the similar signals, and identify multiple signals having relatively weak MCC/MNC. In some aspects, even if the subject signal is unavailable for direct measurement, the presence of other similarly situated signals with relatively weak MCC and/or MNC values could be indicative of packet loss and/or other signal reliability issues associated with the subject signal. Other techniques can be used to configure the user equipment 102 to receive a range of frequencies.

The user equipment 102 can communicate with one or more network device(s) 112 via one or more network(s) 114. For example, the transceiver(s) 106 of the user equipment 102 may transmit one or more metrics 124 to the one or more network device(s) 112, where the metrics 124 include signal strength information.

FIG. 1 illustrates the user equipment 102 capturing metrics 124 associated with the transmitter 110, as described herein. In some instances, the user equipment 102 can receive the signal 108 output by the transmitter 110 and can determine the metrics 124 associated with the signal 108. As illustrated, the metrics 124 associated with the signal 108 can include information indicative of signal strength of the signal 108 as it is received at the user equipment 102, location of the user equipment 102, and other information.

For example, the metrics 124 depicted in FIG. 1 may include RSSI, RSRP, MCC, MNC, a network type, global positioning system (GPS) information, and other information. The metrics 124, and particularly, the example information included in the metrics 124 as depicted in FIG. 1, are only examples and not meant to be limiting.

In some instances, the network device(s) 112 can include an aggregation component 116 that can receive the one or more metrics 124 from the user equipment 102, as well as other user equipment, and aggregate the metrics 124 to generate a visualization 118 and/or one or more recommendation(s) 122. In some instances discussed herein, the visualization 118 can be used, at least in part, to determine and/or indicate locations of transmitters that are active and that are predicted to provide signals having predetermined signal strengths (e.g., RSRP), to determine locations where to deploy base stations or other network devices, to determine and/or indicate locations having and not having signal strength that meets or exceeds a signal strength threshold, to determine and/or indicate locations where a call density associated with the location meets or exceeds a call density threshold, to determine and/or indicate locations where a network signal is associated with poor quality, and to inform decisions regarding optimization of wireless transmissions, among other functions.

For example, the recommendation component 120 may be configured to determine whether a predicted signal strength differs from an aggregated signal strength, and compare the difference of the aggregated and predicted signal strength by evaluating whether the difference meets or exceeds a signal strength threshold. The recommendation component 120 may determine whether a call density associated with the location meets or exceeds a call density threshold, and generate the one or more recommendation(s) 122, which may include a message to update a hardware component associated with the location. As can be understood, the aggregation component 116 and the recommendation component 120 are not limited to outputting the visualization 118 and the recommendation(s) 122, and any number of visualizations, recommendation(s), or data can be utilized, as discussed herein.

Examples of the user equipment 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 can include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 112 can be implemented as one or more communication servers to facilitate communications by and between the various devices in the environment 100. That is, the network device(s) 112 can represent any computing devices implementing various aspects of one or more of second, third, fourth, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 112 may implement GSM, UMTS, LTE/LTE, and/or NR Advanced telecommunications technologies. The network device(s) 112 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device(s) 112, and/or the network(s) 114. In some embodiments, the network device(s) 112 may be operated by a service provider. While FIG. 1 illustrates the network device(s) 112, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 114 can include, but are not limited to networks including second-generation (2G), third-generation (3G), fourth-generation (4G), or fifth-generation (5G) cellular networks, such as NR (New Radio), LTE (Long Term Evolution), and data networks, such as Wi-Fi networks.

In some instances, the user equipment 102 can communicate with any number of user equipment, servers, network devices, computing devices, and the like. Further, in some instances, the user equipment 102 can send the metrics 124 to a network device (such as the network device(s) 112) for aggregation and processing.

In some instances, the user equipment 102 can monitor the signal 108 without utilizing the frequency resources associated with the signal for communication(s). That is, the user equipment 102 can communicate with other devices using a separate base station or wireless transceiver, not illustrated in FIG. 1.

Figure 2:
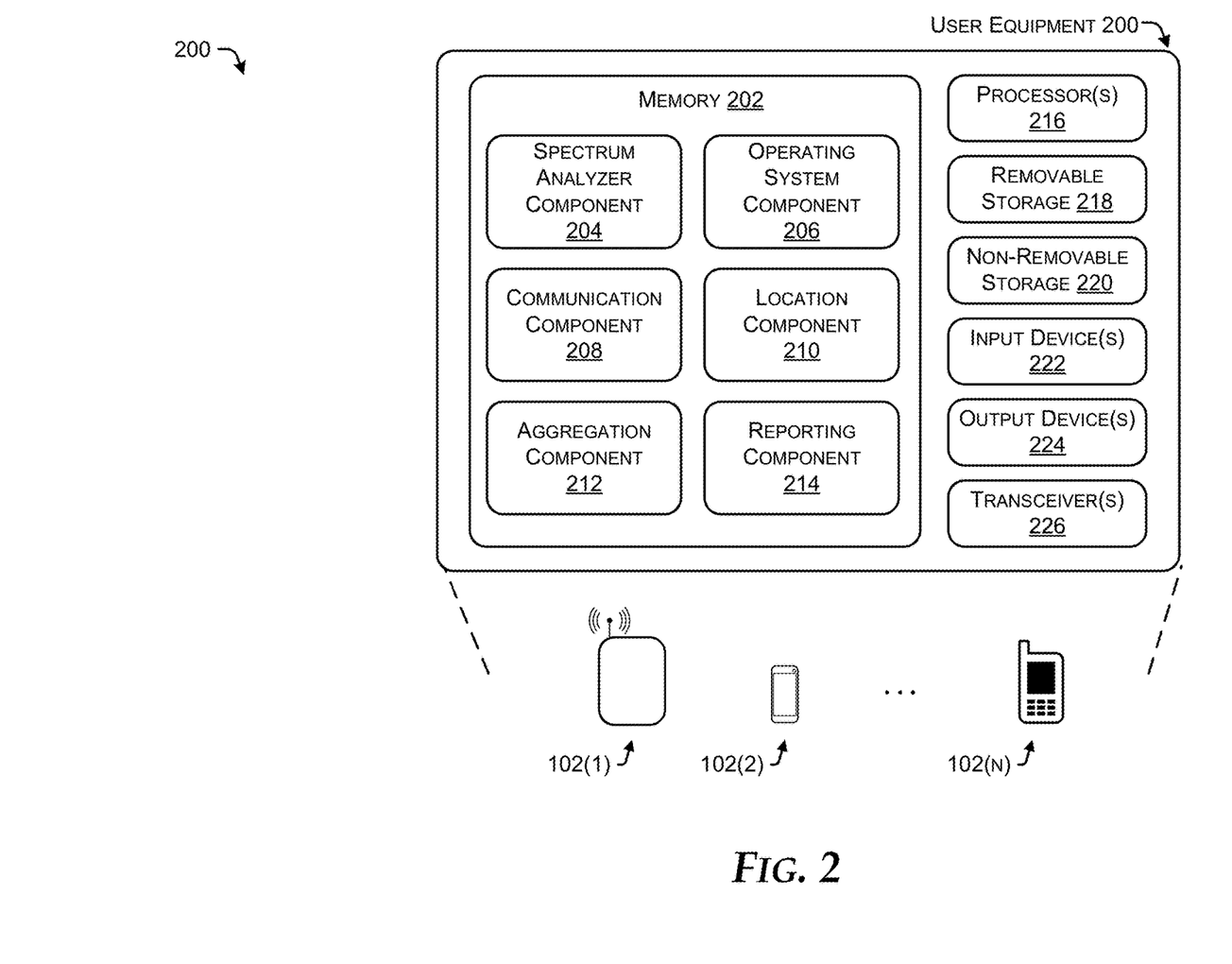
FIG. 2 illustrates an example environment including a user equipment capturing metrics associated with a transmitter, as described herein.

FIG. 2 illustrates an example user equipment 200 configured to implement the spectrum analyzer, in accordance with embodiments of the disclosure. In some embodiments, the user equipment 200 can correspond to the user equipment 102 of FIG. 1. It is to be understood in the context of this disclosure that the user equipment 200 can be implemented as a single device or as a plurality of devices with components and data distributed among them. By way of example, and without limitation, the user equipment 200 can be implemented as various user equipment 102(1), 102(2), . . . , 102(N).

As illustrated, the user equipment 200 comprises a memory 202 storing a spectrum analyzer component 204, an operating system component 206, a communication component 208, a location component 210, a aggregation component 212, and a reporting component 214. Also, the user equipment 200 may include processor(s) 216, a removable storage 218 and non-removable storage 220, input device(s) 222, output device(s) 224, and transceiver(s) 226.

In various embodiments, memory 202 is volatile (such as RAM), non-volatile (such as ROM, flash memory, etc.) or some combination of the two. The spectrum analyzer component 204, the operating system component 206, the communication component 208, the location component 210, the aggregation component 212, and the reporting component 214 stored in the memory 202 can comprise methods, threads, processes, applications or any other sort of executable instructions. The spectrum analyzer component 204, the operating system component 206, the communication component 208, the location component 210, the aggregation component 212, and the reporting component 214 can also include files and databases.

In some instances, the spectrum analyzer component 204 can correspond to the spectrum analyzer component 104 of FIG. 1. The spectrum analyzer component 204 can include functionality to determine one or more metrics associated with a signal received, detected, or otherwise monitored by the user equipment 200. For example, the spectrum analyzer component 204 can determine metrics including but not limited to RSSI, RSRP, RSRQ, SINR, power density and the like for a specific bandwidth in the frequency domain. In some instances, information can be associated with the metrics, such as a band number, channel number, block identifier, and the like. In some instances, the spectrum analyzer component 204 can scan a frequency resource at any regular or irregular interval, or can initiate a scan based on an internal or external trigger or command. For example, the spectrum analyzer component 204 can receive an instruction from a remote network device to initiate a scan. In some instances, the spectrum analyzer component can determine operating conditions or characteristics of the user equipment 200 (e.g., a power resource, location, etc.), and a command to initiate scanning can be based at least in part on those operating conditions or characteristics. In some instances, the spectrum analyzer component 204 can include previously-collected measurements. In some instances, the spectrum analyzer component 204 can sample conditions of a signal over a period of time and perform a statistical analysis to determine additional metrics (e.g., average, median, high, low, etc.) associated with the signal.

In some instances, the spectrum analyzer component 204 can be implemented as an application operating on the user equipment 200. In some instances, to initiate a scan of one or more frequency resources, the spectrum analyzer component can call an API (application programming interface) implemented in the operating system component 206.

In some instances, the spectrum analyzer component 204 can include functionality to present a user interface on the user equipment 200, for example, to receive an indication from a user enabling or disabling a spectrum analyzer mode of the spectrum analyzer component 204. For example, in some instances, a user of the user equipment can turn on or turn off the spectrum analyzer component 204 based on personal preferences, incentives from a service provider, inclusion in a voluntary program, and the like.

The operating system component 206 can include functionality to query a chipset of the user equipment 200, and/or to query the transceiver(s) 226, to instruct the transceiver(s) 226 and/or any software or hardware to scan one or more channels or frequency resources to determine metrics associated with the channel or frequency resources, for example. In some instances, the operating system component 206 can include a first API to receive instructions from the spectrum analyzer component 204 and to provide data to the spectrum analyzer component 204, and a second API to issue instructions to software or hardware associated with a modem or the transceiver(s) 226 and to receive data from such components.

The communication component 208 can include functionality to conduct communications with one or more other devices, as discussed herein. In some instances, the communication component 208 can conduct a communication via a first set of frequency resources, while the spectrum analyzer component 204 can analyze a second set of frequency resources. In some instances, at least a portion of the first set and the second set of frequency resources can be overlapping, and in some instances, the first set and the second set of frequency resources can be independent. In some instances, the communication component 208 can take priority over resources of the user equipment 200 to conduct a communication. That is, if the spectrum analyzer component 204 initiates a scan of a frequency resource, and if the communication component 208 subsequently initiates a communication using the frequency resource or another frequency resource, in some instances, the communication component 208 can initiate the communication by interrupting the spectrum analyzer component 204. In some instances, other prioritization schemes may be used, and the communication component 208 can have any relative or absolute priority level.

The location component 210 can include functionality to determine a location of the user equipment 200. In some instances, the location component 210 can determine a location based at least in part on GPS location data, base station identity, Wi-Fi access point identity, or a combination of location sources. In some embodiments, a location can include a mobile network code (MNC) and a mobile country code (MCC) used in combination to uniquely identify a mobile network carrier network. In some embodiments, the location component 210 can determine a base station or cell identity, and/or latitude, longitude, altitude information, and timestamp information. In some instances, the location can be determined in connection with determining one or more metrics associated with a signal or channel. In some instances, the location can be provided to a network device, for example, for aggregation and analysis. In some instances, the location component 210 can determine a location of the user equipment 200 relative to a location of a geofenced location. For example, the location component 210 can receive a geofenced location from a network device.

The aggregation component 212 may include functionality to aggregate signal strength information associated with the user equipment 200, including one or more of the metrics 124 discussed with respect to FIG. 1. For example, the aggregation component may evaluate RSSI, RSRP, MCC, MNC, network type information, location information received from the location component 210, time and/or date information, etc., and save the metrics to the removable storage 218 and/or the non-removable storage 220. As discussed hereafter, one or more triggering events may cause the user equipment 200 to transmit the signal strength information by retrieving the metrics from the removable storage 218 and/or the non-removable storage 220, and transmitting the signal strength information via the transceiver(s) 226 to the network device(s) 112.

The reporting component 214 can include functionality to store one or more metrics associated with one or more frequency resources and to send such metrics to a network device. In some instances, the reporting component 214 can send the one or more metrics to a network device as the one or more metrics are generated, captured, or determined. In some instances, the reporting component 214 can send the metrics to the network device. In some instances, the reporting component 214 can send the metrics based on a connection type of the user equipment 200 (e.g., when the user equipment 200 is connected to a Wi-Fi network). In some instances, the reporting component 214 can send the metrics at a time of low network congestion (e.g., at night). In some instances, the reporting component 214 can transmit metrics in response to a query from a network device, for example. In some instances, the reporting component 214 can encode the data sent to a network device such that a service provider tracking data usage does not count the data against a quota associated with the user equipment 200.

In some embodiments, the processor(s) 216 is a central processing unit (CPU), a graphics processing unit (GPU), or both CPU and GPU, or other processing unit or component known in the art.

The user equipment 200 also includes additional data storage devices (removable and/or non-removable) such as, for example, magnetic disks, optical disks, or tape. Such additional storage is illustrated in FIG. 2 by removable storage 218 and non-removable storage 220. Tangible computer-readable media can include volatile and non-volatile, removable and non-removable media implemented in any method or technology for storage of information, such as computer readable instructions, data structures, program modules, or other data. Memory 202, removable storage 218 and non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media can be part of the user equipment 200.

In various embodiments, the user equipment 200 can include applications including but are not limited, a web browser application, a video streaming application, an online gaming application, a spectrum analyzer, and the like. During execution on the user equipment 200, each of the applications may be configured to cause the user equipment 200 to initiate data communications with the network device(s) 112 over the network(s) 114.

The user equipment 200 may be configured to communicate over a telecommunications network using any common wireless and/or wired network access technology. Moreover, the user equipment 102 may be configured to run any compatible device operating system (OS), including but not limited to, Microsoft Windows Mobile, Google Android, Apple iOS, Linux Mobile, as well as any other common mobile device OS.

The user equipment 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the user equipment 200 also includes one or more wired or wireless transceiver(s) 226. For example, the transceiver(s) 226 can include a network interface card (NIC), a network adapter, a LAN adapter, or a physical, virtual, or logical address to connect to various network(s) 114, or to the network device(s) 112, for example. To increase throughput when exchanging wireless data, the transceiver(s) 226 can utilize multiple-input/multiple-output (MIMO) technology. The transceiver(s) 226 can comprise any sort of wireless transceivers capable of engaging in wireless, radio frequency (RF) communication. The transceiver(s) 226 can also include other wireless modems, such as a modem for engaging in Wi-Fi, WiMax, Bluetooth, infrared communication, and the like.

In some instances, the transceiver(s) 226 can correspond to the transceiver(s) 106 of FIG. 1.

Figure 3:
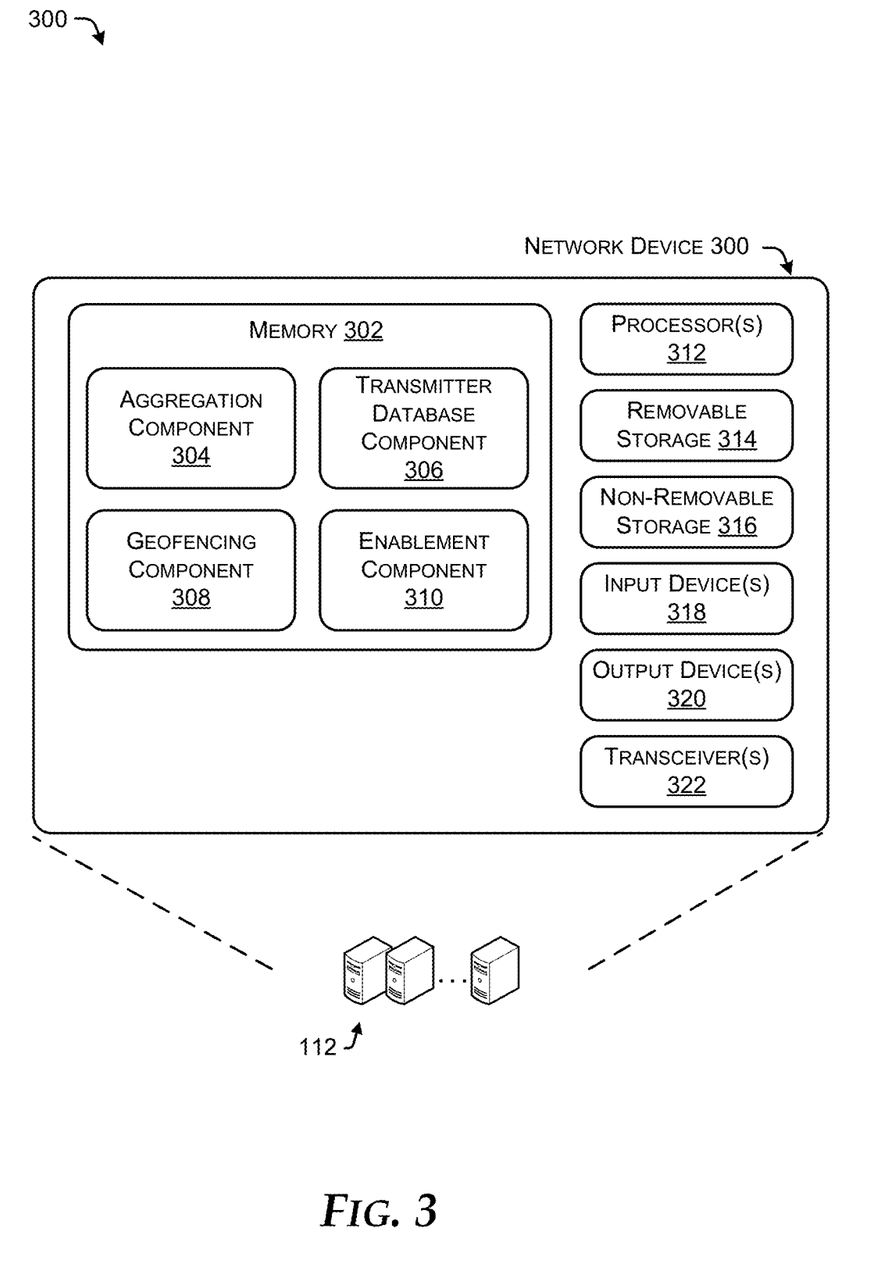
FIG. 3 illustrates an example network device configured to receive network metrics captured by user equipment, in accordance with embodiments of the disclosure.

FIG. 3 illustrates an example network device 300 configured to receive network metrics captured by user equipment, in accordance with embodiments of the disclosure. In some embodiments, the network device 300 can correspond to the network device(s) 112 of FIG. 1. It is to be understood in the context of this disclosure that the network device 300 can be implemented as a single device or as a plurality of devices with components and data distributed among them.

As illustrated, the network device 300 comprises a memory 302 storing an aggregation component 304, a transmitter database component 306, a geofencing component 308, and an enablement component 310. Also, the network device 300 includes processor(s) 312, a removable storage 314 and non-removable storage 316, input device(s) 318, output device(s) 320, and transceiver(s) 322.

In various embodiments, the memory 302 is volatile (such as RAM), non-volatile (such as ROM, flash memory, etc.) or some combination of the two. The aggregation component 304, the transmitter database component 306, the geofencing component 308, and the enablement component 310 stored in the memory 302 can comprise methods, threads, processes, applications or any other sort of executable instructions. The aggregation component 304, the transmitter database component 306, the geofencing component 308, and the enablement component 310 can also include files and databases.

The aggregation component 304 can include functionality to receive one or more metrics determined and/or captured by user equipment, as discussed herein. In some instances, the aggregation component 304 can receive a plurality of metrics and store the metrics in a database. In some instances, the metrics can be indexed by location, time, user equipment, and the like. In some instances, the aggregation component 304 can perform any statistical analysis on the metrics to determine a variety of signal characteristics. For example, the aggregation component 304 can determine a signal type (e.g., TV, radio, cell phone, etc.) as well as quantitate or qualitative characteristics of the signal.

In some instances, the aggregation component 304 can correspond to the aggregation component 116 of FIG. 1.

The transmitter database component 306 can store locations of transmitters and/or base stations in a database. Further, the transmitter database component 306 can receive location data and/or metrics associated with a signal to determine which transmitter corresponds to the metrics. In some instances, the transmitter database component 306 can determine a confidence value associated with the identity of a transmitter or base station.

The geofencing component 308 can include functionality to determine areas in which the spectrum analysis should be performed. For example, the geofencing component 308 can determine areas around a legacy transmitter (e.g., a TV antenna) where metrics are to be determined. In some instances, the geofencing component 308 can determine areas where network resources (e.g., new base stations) are to be deployed to confirm signal status in that area. In some instances, the geofencing component 308 can determine areas where signal characteristics are known such that the spectrum analysis is not needed. In some instances, the geofencing component 308 can send indications of the geofenced locations to one or more user equipment to collect metrics, as discussed herein.

The enablement component 310 can include functionality to enable a spectrum analysis component for individual user equipment. For example, the enablement component 310 can send invitations to various user equipment to determine if users of the user equipment wish to activate the spectrum analyzer, as discussed herein. In some instances, the enablement component 310 can enable the spectrum analyzer component for individual user equipment based at least in part on characteristics of the user component, such as whether an antenna of the user equipment is configured to receive signals associated with particular frequency resources.

In further examples, the enablement component 310 can provide an instruction or indication to conduct drive-testing in an area based at least in part on metrics obtained by user equipment, as discussed herein.

In some embodiments, the processor(s) 312 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media can include volatile and nonvolatile, removable and non-removable media implemented in any method or technology for storage of information, such as computer readable instructions, data structures, program modules, or other data. Memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 300. Any such tangible computer-readable media can be part of the network device 300.

The network device 300 can include input device(s) 318, such as a keypad, a cursor control, a touch-sensitive display, etc. Also, the network device 300 can include output device(s) 320, such as a display, speakers, etc. These devices are well known in the art and need not be discussed at length here.

As illustrated in FIG. 3, the network device 300 can include one or more wired or wireless transceiver(s) 322. In some wireless embodiments, to increase throughput, the transceiver(s) 322 can utilize multiple-input/multiple-output (MIMO) technology. The transceiver(s) 322 can be any sort of wireless transceivers capable of engaging in wireless, radio frequency (RF) communication. The transceiver(s) 322 can also include other wireless modems, such as a modem for engaging in Wi-Fi, WiMax, Bluetooth, infrared communication, or the like.

Figure 4:
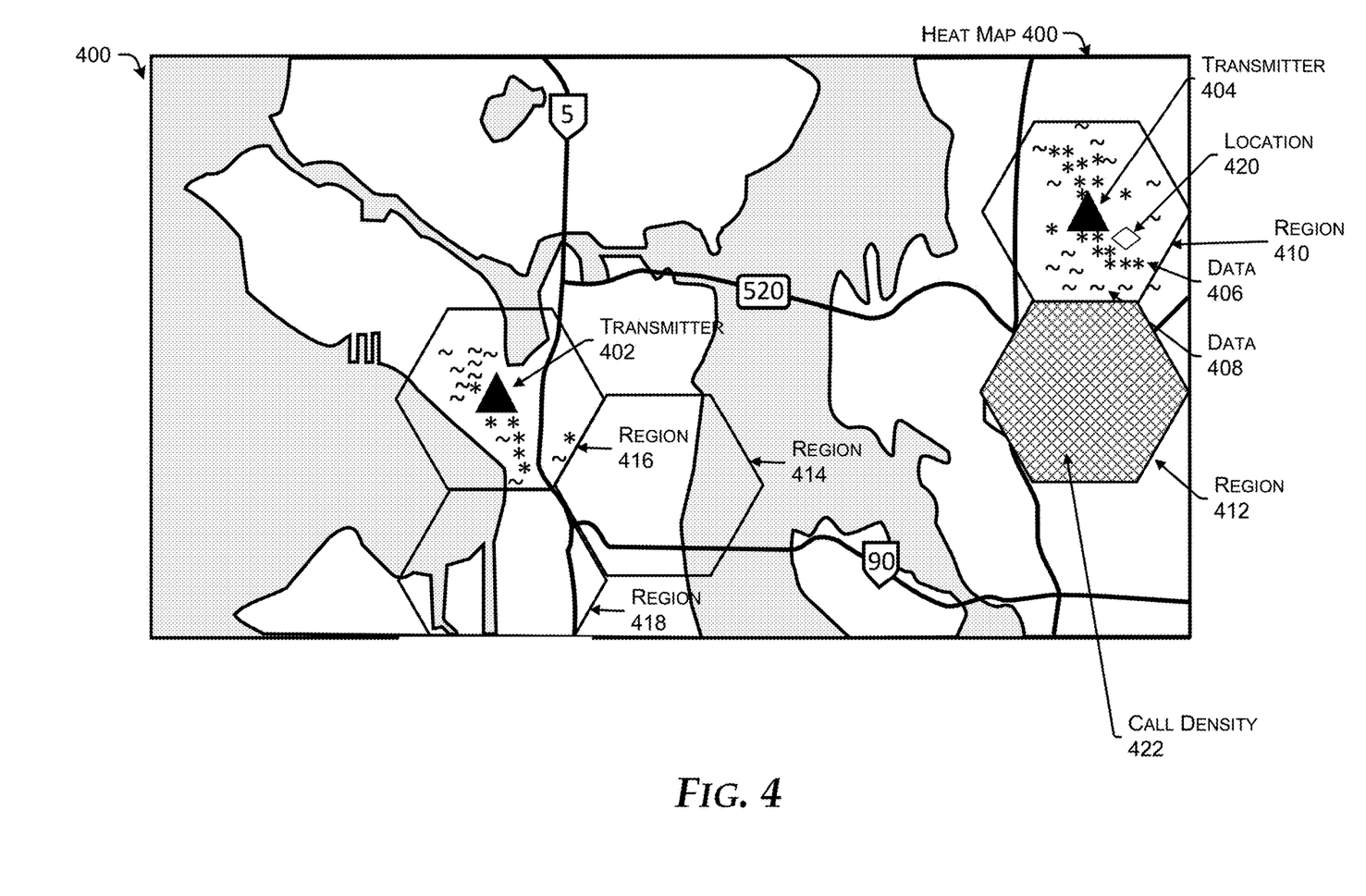
FIG. 4 illustrates an example visualization of data, in accordance with embodiments of the present disclosure.

FIG. 4 illustrates an example visualization of data including data captured using a spectrum analyzer, as discussed herein. In some instances, the example visualization can be represented as a heat map 400.

In some instances, the heat map 400 can represent various transmitters 402 and 404 in an environment. Further, the heat map 400 can represent various data 406 and 408, which can correspond to aggregated data and/or individual metrics collected by user equipment, as discussed herein. The heat map 400 can also represent various locations bounded by geographic regions, which are depicted as regions 410, 412, 414, 416, and 418. One or more locations 420 may be included in the heat map 400, which may be a sub-region, a building, a set of buildings, etc. The data 406 and 408 may include signal strength information comprising one or more metrics, such as RSSI, RSRP, RSRQ, SINR, MCC, MNC, network type, etc., as determined by the user equipment. For example, a relatively high RSSI metric can be represented as the data 406, corresponding to the symbol "*". The metrics 124 (FIG. 1) may be one example of the data 406 and 408. In some examples, a relatively lower RSSI metric can be represented as the data 408, corresponding to the symbol "~". Of course, any indications (e.g., color, size, shape, labels, etc.) can be used to distinguish between various metrics. The heat map 400 may also include an indication of call density for one or more of the regions 410-418. For example, the region 412 depicts a call density 422, which is depicted as a hatch pattern within the region 412. Although not shown in FIG. 4, a call density may be associated with any or all of the regions 410-418. Although only 5 regions are depicted, it should be appreciated that any number of regions may be included in the heat map 400.

In some instances, the heat map 400 can be used, at least in part, to determine one or more recommendations (e.g., the recommendation(s) 122 in FIG. 1). The recommendation(s) 122 may include one or more suggested locations where active transmitters (e.g., the transmitter 402 or 404) are located, where user equipment experience interference, weak or strong signal strength, etc., and/or where to deploy additional base stations, for example. In other instances, the size, shape, location, call density, or other information associated with the regions 410-418 may be used to determine one or more recommendations for augmenting the infrastructure of the telecommunications network.

In some instances, the heat map 400 may include a geographic region associated with the network transceiver, where the geographic region is output having a color associated with the coverage area. The color may be indicative of the aggregated signal strength associated with the network transceiver. In other aspects, the geographic region may be output having a pattern representative of the aggregated signal strength, and/or an opacity associated with the aggregated signal strength, and/or call density.

In some instances, the heat map 400 can be generated by the aggregation components 116 and 404, as discussed herein. Of course, the example visualizations are not limited to the heat map 400. Further, the transmitters 404 and 404 are not limited to transmitters, and include any transceivers and/or base stations.

Figure 5:
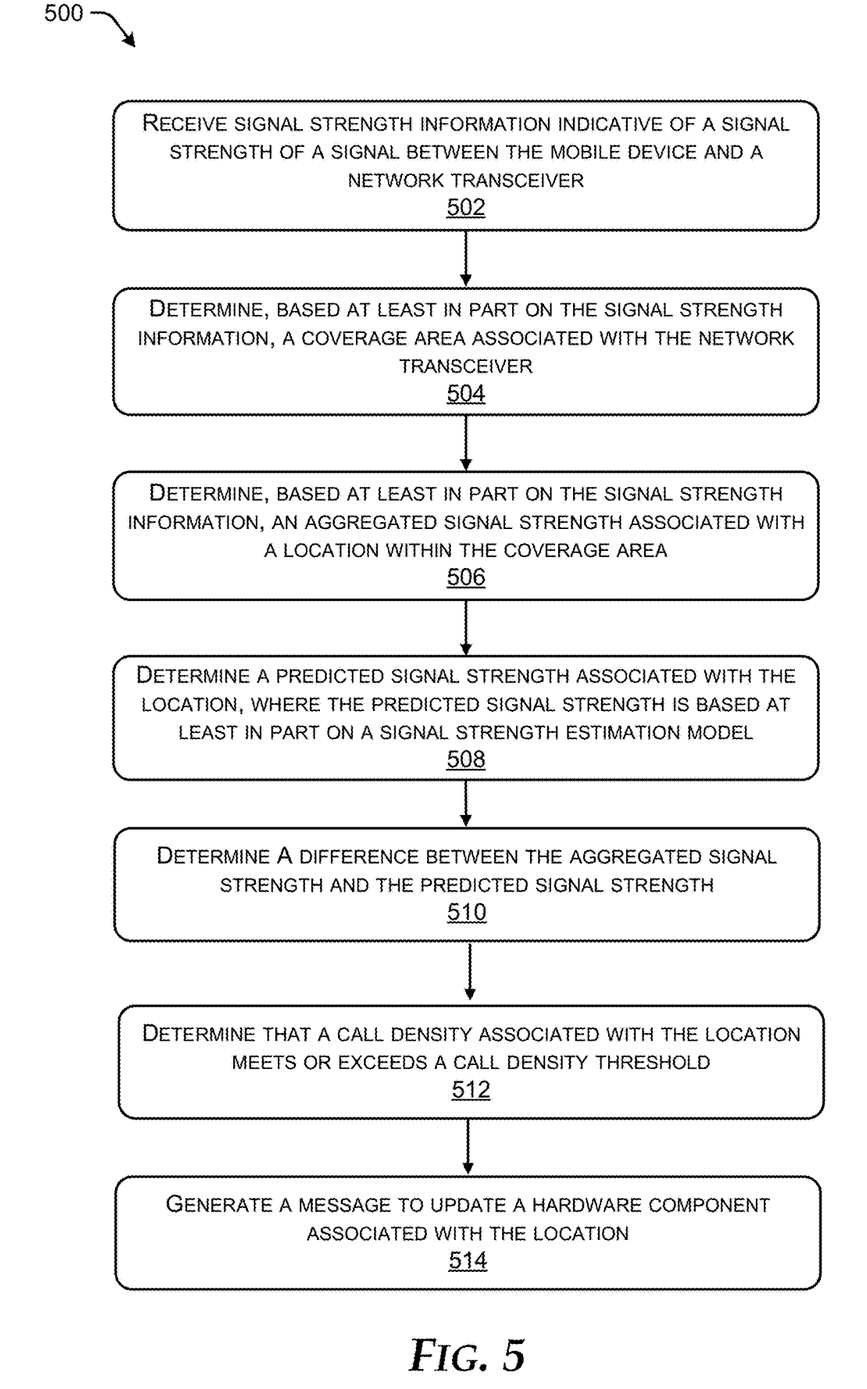
FIG. 5 illustrates an example process in accordance with embodiments of the present disclosure.

FIG. 5 illustrates an example processes in accordance with embodiments of the disclosure. This process is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

At operation 502, the one or more processor(s) 312 may receive, from the user equipment 200, signal strength information indicative of a signal strength of a signal between the user equipment 200 and the network transceiver (e.g., the transmitter 110) in the mobile device telecommunications network (e.g., the environment 100, as depicted in FIG. 1). The signal strength information may be, for example, the one or more metrics 124 (FIG. 1).

The user equipment 200 may transmit the signal strength information based at least in part on one or more triggering events. For example, the signal strength information may be sent based at least in part on a user launch of a media application using the user equipment 200. In one aspect, launching a particular application may be a triggering event, where opening that application, without regard to the signal status (connected to the network, not connected to the network, threshold RS SI values, RSRP values, etc.).

In another aspect, the user equipment 200 may trans it the signal strength information based at least in part on signal strength measured by the user equipment 200. For example, the one or more processor(s) 216 may cause spectrum analyzer component 204 to evaluate the RSRP, or another metric, and transmit the signal strength information when the signal strength exceeds or does not exceed a predetermined threshold of RSRP, etc.

In another aspect, the user equipment 200 may transmit the signal strength information based at least in part on the roaming network setting MCC/MNC, or another indicator of a roaming setting of the user equipment 200.

In another aspect, the user equipment 200 may transmit the signal strength information based at least in part on the network type used by the user equipment 200. For example, the user equipment 200 may connect to the network using LTE, 3G, 2G, 5G, etc. In one aspect, the reporting component 214 may be configured to send the signal strength information when any one or more network connection types are made between the user equipment 200 and the network transceiver. In another aspect, the reporting component 214 may send the signal strength information when a combination of network connection types are connected sequentially and/or within a predetermined period of time. For example, when LTE is used to connect the user equipment 200 to the transceiver, and the connection is lost and/or replaced by another connection type (e.g., 3G), the reporting component 214 may send the signal strength information.

In another aspect, the user equipment 200 may transmit the signal strength information based at least in part on the network connectivity status of the user equipment 200, and transmit the signal strength information at some time after the user equipment 200 has lost connection with the network, and/or connected via Wi-Fi or other means.

In another aspect, the user equipment 200 may transmit the signal strength information after a predetermined period of time, where the signal strength information includes one or more locations of the user equipment 200, metrics 124 associated with the one or more locations, time information, date information, etc.

The signal strength information transmitted from a multitude of user equipment (of which the user equipment 102 may be a part) can be aggregated at the network device 300 without overwhelming network infrastructure, reducing operating speed of network components, etc. The network device 300 may receive the signal strength information (e.g., the metrics 124 as shown in FIG. 1), from one or more user equipment (e.g., the user equipment 102). In a practical example, the network device 300 may receive signal strength information from a multitude of network devices, which may be tens, hundreds, or more devices that operate within a particular geographic region. Accordingly, receiving the signal strength information may include receiving a plurality of metrics from a plurality of devices, where the signal strength information may be received in one or more aggregated or individual transmissions that include a plurality of call data and/or application activity for each respective user equipment, for a period of time.

At operation 504, after the network device 300 receives the signal strength information (e.g., the metrics 124 as shown in FIG. 1), the one or more processor(s) 312 may cause the geofencing component 308 to determine, based at least in part on the signal strength information, a coverage area associated with the network transceiver. The coverage area may include geographic information associated with a signal transmitted by a particular transmitter, cell, etc. The geographic region may include geographic areas within a predetermined radius from a transmitter, cell, group of cells, etc. For example, FIG. 4 depicts the regions 410-418, which may represent various geographic regions. In other aspects, a geographic region may include one or more location(s) within the region, such as the location 420 as shown in FIG. 4.

At operation 506, the one or more processor(s) 312 may determine, using the aggregation component 304, and based at least in part on the signal strength information, an aggregated signal strength associated with a location within the coverage area. In one aspect, the network device 300 may aggregate the signal strength information associated with the geographic region. For example, a mobile device may have signal strength information associated with three separate voice calls and four launched applications on that device while operating within the geographic region. When the network device 300 has received a plurality of signal strength metrics associated with a plurality of devices operating within that region, the aggregation component 304 may average the metrics to obtain an aggregated signal strength of devices operating within that geographic region. Determining the aggregated signal strength information associated with the geographic region may include averaging metrics received from user devices operating within that particular region, or by performing other aggregation techniques.

At operation 508, the one or more processor(s) 312 may determine a predicted signal strength associated with the location, wherein the predicted signal strength is based at least in part on a signal strength estimation model. The signal estimation model may include average expected signal strength values associated with particular geographic regions. For example, in one specific region, there may be multiple transmitters servicing the region such that RSSI is known to be strong within the region, or there may be a single transmitter servicing the region but transmitting a particular signal strength, or using a particular band of transmission frequencies.

Although there may be any number of factors that can determine causality for particular signal strengths observed within a particular region, it should be appreciated that the expected signal strength for a particular region may be determined experimentally, heuristically, mathematically, or using other methods, such that one or values indicative of signal strength may be associated with particular geographic regions and saved as a signal estimation model. Stated in another way, the signal strength estimation model may indicate known and/or predicted signal strength values associated with geographic service regions. The signal estimation model may be a lookup table, database, or any other data structure configured to provide estimated signal strength values correlated with respective geographic regions. The signal estimation model may be stored in any operatively connected computer-readable memory such as, for example, the non-removable storage 316, the removable storage 314, or another computer memory.

At operation 510, the one or more processor(s) 312 may determine a difference between the aggregated signal strength and the predicted signal strength. In some instances, the one or more processor(s) 312 may determine whether the difference between the aggregated signal strength and the predicted signal strength meets or exceeds a signal strength threshold. For example, the processor(s) 312 may retrieve a predicted signal strength associated with a region of interest (e.g., the region 410 as shown in FIG. 4) from the estimation model. In other aspects, the processor(s) 312 may retrieve a predicted signal strength associated with a location (e.g., the location 420) within the region of interest, and determine a predicted signal strength for the location 420. As shown in FIG. 4, the location 420 is surrounded by data 406, which is shown as the symbol "*" representing a relatively high RSSI for that location. In one example, the aggregated signal strength may include a plurality of RSSI data received from devices operating within the location 420. In one aspect, the processor(s) 312 may determine the difference between the aggregated signal strength from the devices operating within the location 420, and the expected or predicted signal strength (the data 406). The difference may be quantifiable in terms of a numeric difference in signal strength. The processor(s) 312 may evaluate whether the difference the meets or exceeds a signal strength threshold, which may be a value or set of values stored as part of the estimation model, for example.

At operation 512, the one or more processor(s) 312 may determine whether a call density associated with the location meets or exceeds a call density threshold. The call density (e.g., the call density 422) may quantify an average number of network-connected devices operating within a particular geographic region. Call density may also include one or more values indicative of calls made from devices operating in the geographic region. In some instances, the call density may be useful to determine one or more recommendations based on a respective cost for adding network equipment or performing one or more other remedies that can address a relatively low signal strength in a particular region and/or location.

At operation 514, the one or more processor(s) 312 may generate a message to update a hardware component associated with the location. For example, the one or more processor(s) 312 may generate the recommendation(s) 122, and/or the visualization 118. The recommendation(s) may include one or more messages indicative of equipment, devices, power settings, equipment settings, placement of the equipment, and/or other features. For example, the processor(s) 312 may determine that a particular region has relatively high signal power except for a specific location corresponding to the interior of a large building complex.

After evaluating the call density associated with the location, the processor(s) 312 may determine that the call density is at least a threshold call density to justify the addition of a new network transceiver. The processor(s) 312 may generate a message comprising a recommendation to add an additional network transceiver in a geographic region associated with the coverage area, where the recommendation is based at least in part on the map of the geographic region.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor-implemented method comprising:
   receiving, from a mobile device, signal strength information indicative of a signal strength of a signal between the mobile device and a network transceiver in a mobile device telecommunications network, the signal being outside of a frequency band used by the mobile device for conducting communications;
   determining, based at least in part on the signal strength information, a coverage area associated with the network transceiver;
   determining, based at least in part on the signal strength information, an aggregated signal strength associated with a location within the coverage area;
   determining a predicted signal strength associated with the location, wherein the predicted signal strength is based at least in part on a signal strength estimation model;
   determining a difference between the aggregated signal strength and the predicted signal strength;
   determining that the difference meets or exceeds a signal strength threshold;
   determining that a call density associated with the location meets or exceeds a call density threshold; and
   generating a message to update a hardware component associated with the location.

2. The processor-implemented method of claim 1, wherein the signal strength information is received based at least in part on a user launch of a media application using the mobile device.

3. The processor-implemented method of claim 1, wherein the signal strength information is further indicative of at least one of a telecommunications network type associated with the mobile device or a roaming network indicator indicative of a roaming setting on the mobile device.

4. The processor-implemented method of claim 1, further comprising generating a graphic output associated with the message, the graphic output comprising at least:
   a map of a geographic region associated with the network transceiver;
   the coverage area; and
   a color associated with the coverage area indicative of the aggregated signal strength associated with the network transceiver.

5. The processor-implemented method of claim 4, wherein an opacity of the color is indicative of the call density.

6. The processor-implemented method of claim 1, wherein the message comprises a recommendation to add an additional network transceiver in a geographic region associated with the coverage area.

7. The processor-implemented method of claim 1, wherein the message comprises a suggested location for the network transceiver based at least in part on the call density, the coverage area, and the signal strength information.

8. The processor-implemented method of claim 1, further comprising generating a graphic output associated with the message, the graphic output comprising a map of a geographic region associated with the network transceiver, wherein the graphic output is based at least in part on the call density associated with the coverage area.

9. The processor-implemented method of claim 8, wherein the map is indicative of an outer limit of audio transmissions and the signal strength information.

10. The processor-implemented method of claim 8, wherein the graphic output identifies a suggested location for a transmission hardware change.

11. A non-transitory computer-readable storage medium storing computer-executable instructions that, when executed, cause one or more processors of a first device to perform acts comprising:
    receiving, from a mobile device, signal strength information indicative of a signal strength of a signal between the mobile device and a network transceiver in a mobile device telecommunications network, the signal being outside of a frequency band used by the mobile device for conducting communications;
    determining, based at least in part on the signal strength information, a coverage area associated with the network transceiver;
    determining, based at least in part on the signal strength information, an aggregated signal strength associated with a location within the coverage area;
    determining a predicted signal strength associated with the location, wherein the predicted signal strength is based at least in part on a signal strength estimation model;
    determining a difference between the aggregated signal strength and the predicted signal strength;
    determining that the difference meets or exceeds a signal strength threshold;
    determining that a call density associated with the location meets or exceeds a call density threshold; and
    generating a message to update a hardware component associated with the location.

12. The non-transitory computer-readable storage medium of claim 11, wherein the signal strength information is further indicative of at least one of a telecommunications network type associated with the mobile device or a roaming network indicator indicative of a roaming setting on the mobile device.

13. The non-transitory computer-readable storage medium of claim 11, further comprising generating a graphic output associated with the message, the graphic output comprising at least:
    a map of a geographic region associated with the network transceiver;
    the coverage area; and
    a color associated with the coverage area indicative of the aggregated signal strength associated with the network transceiver.

14. The non-transitory computer-readable storage medium of claim 13, wherein an opacity of the color is indicative of the call density.

15. The non-transitory computer-readable storage medium of claim 11, wherein the message comprises a recommendation to add an additional network transceiver in a geographic region associated with the coverage area.

16. The non-transitory computer-readable storage medium of claim 11, wherein the message comprises a suggested location for the network transceiver based at least in part on the call density, the coverage area, and the signal strength information.

17. The non-transitory computer-readable storage medium of claim 11, further comprising generating a graphic output associated with the message, the graphic output comprising a map of a geographic region associated with the network transceiver, wherein the graphic output is based at least in part on the call density associated with the coverage area.

18. The non-transitory computer-readable storage medium of claim 17, wherein the map is indicative of an outer limit of audio transmissions and the signal strength information.

19. The non-transitory computer-readable storage medium of claim 17, wherein the graphic output identifies a suggested location for a transmission hardware change.

20. A system comprising:
one or more processors; and
one or more computer-readable media storing instructions executable by the one or more processors, wherein the instructions, when executed, cause the system to perform operations comprising:
receiving, from a mobile device, signal strength information indicative of a signal strength of a signal between the mobile device and a network transceiver in a mobile device telecommunications network, the signal being outside of a frequency band used by the mobile device for conducting communications;
determining, based at least in part on the signal strength information, a coverage area associated with the network transceiver;
determining, based at least in part on the signal strength information, an aggregated signal strength associated with a location within the coverage area;
determining a predicted signal strength associated with the location, wherein the predicted signal strength is based at least in part on a signal strength estimation model;
determining a difference between the aggregated signal strength and the predicted signal strength;
determining that the difference meets or exceeds a signal strength threshold;
determining that a call density associated with the location meets or exceeds a call density threshold; and
generating a message to update a hardware component associated with the location.

* * * * *